United States Patent [19]
Ziv

[11] Patent Number: 6,092,869
[45] Date of Patent: Jul. 25, 2000

[54] APPARATUS TO IMPROVE THE RETENTION OF A CHILD SEAT IN A VEHICLE

[76] Inventor: Avraham Ziv, 9524 Whitaker Ave., Northridge, Calif. 91343

[21] Appl. No.: 09/196,897

[22] Filed: Nov. 19, 1998

Related U.S. Application Data

[60] Provisional application No. 60/078,110, Mar. 16, 1998.
[51] Int. Cl.$^7$ ...................................................... A47C 1/08
[52] U.S. Cl. ........................................ 297/250.1; 297/464
[58] Field of Search .................................... 242/370, 405, 242/471, 472, 916; 81/488, 486; 297/250.1, 463.1, 463.2, 464, 474, 479, 483, 468, 469

[56] References Cited

U.S. PATENT DOCUMENTS

| | | |
|---|---|---|
| 1,784,064 | 12/1930 | Griswold . |
| 3,125,907 | 3/1964 | Derrickson . |
| 4,120,466 | 10/1978 | Adomeit ................................ 242/107.2 |
| 4,180,283 | 12/1979 | Ziv ............................................ 280/802 |
| 4,238,086 | 12/1980 | Brimmeier . |
| 4,492,348 | 1/1985 | Ziv et al. ............................... 242/107.2 |
| 4,544,112 | 10/1985 | Ziv ........................................ 242/107.2 |
| 5,248,187 | 9/1993 | Harrison ................................... 297/482 |
| 5,695,243 | 12/1997 | Anthony et al. ...................... 297/250.1 |
| 5,902,015 | 5/1999 | Allcock . |

*Primary Examiner*—Milton Nelson, Jr.

[57] ABSTRACT

A seat belt tensioning apparatus in accordance with the preferred embodiment of the present invention includes, among other elements, (1) a main body portion having a head or top portion at one end and a winding member at the opposite end, and (2) a crank handle being connected to the head or top portion of the main body portion. The winding member of the main body portion has a plurality of winding extensions. In the preferred embodiment, the winding member includes two winding extensions. The winding extensions are sufficiently spaced apart to form a belt reception space to receive a seat belt webbing. After the seat belt is inserted into the belt reception space, the crank handle may then be turned to cause the seat belt to wind around the winding extensions, thereby removing excess slacks in the seat belt.

13 Claims, 4 Drawing Sheets

APPARATUS TO IMPROVE THE RETENTION OF A CHILD SEAT IN A VEHICLE

CROSS REFERENCE TO RELATED APPLICATION

This application claims the priority of Provisional Application Serial No. 60/078,110, filed Mar. 16, 1998, entitled APPARATUS TO IMPROVE THE RETENTION OF A CHILD SEAT IN A VEHICLE which is hereby incorporated by reference for all purposes.

FIELD OF THE INVENTION

The present invention pertains in general to means for securing a child seat to a vehicle seat to facilitate the carrying of small children in vehicles, and more particularly, to an apparatus used to improve the retention of a standard child seat in a vehicle by removing the excess slack and thereby increasing the tension of a seat belt that is used to secure the standard child seat to a traditional vehicle seat.

BACKGROUND OF THE INVENTION

The present invention pertains in general to means for securing a child seat to a vehicle seat using a traditional seat belt system available in the vehicle, and more particularly, to the construction and use of a seat belt tensioning apparatus to improve the retention of the child seat by removing the excess slack and thereby increasing the tension of the seat belt.

When a small child rides in a vehicle, the child is often placed in a child seat mounted on a seat of the vehicle. A child seat is typically secured to the automobile in some fashion utilizing the seat belts that are supplied inside the vehicle. For example, a child seat may be secured to a vehicle seat by passing a lap safety belt about the child seat and, in effect, buckling it in place on the vehicle seat just as a passenger would buckle himself to the vehicle seat. However, the standard seat belts for an automobile are designed to secure an adult to the seat of the automobile rather than to hold a child seat. Consequently, a child seat is typically designed so that it could be secured to a vehicle seat using several different types of restraining means available in different automobiles. These include but are not limited to lap belts, shoulder belts, combined lap and shoulder belts and the like.

Due to the various configurations of the seat belt systems, a seat belt may be routed at times through a complex path around or through the child seat to secure the child seat to the vehicle seat. As a result, there may be excess slack in the seat belt. The excess slack may cause the child safety seat to move around in the vehicle seat, which may in turn cause the child occupant to move around in the child safety seat during the normal operation of the vehicle. In the event of an accident, a tremendous inertia change may occur within the vehicle. The force resulting from the tremendous inertia change may transfer to the child safety seat to cause it and its child occupant to move around, and may thereby causing injury to the child occupant.

Therefore, it is highly desirable to provide an apparatus which could be used to remove the excess slack from the automobile safety belt system to increase the tension of the vehicle seat belt, resulting in a more secure and safer child seat installation.

BRIEF SUMMARY OF THE INVENTION

The present invention pertains in general to means for securing a child seat to a vehicle seat using a traditional seat belt system available in the vehicle, and more particularly, to the construction and use of a seat belt tensioning apparatus to improve the retention of the child seat by removing the excess slack and thereby increasing the tension of the seat belt. A seat belt tensioning apparatus in accordance with the preferred embodiment of the present invention includes, among other elements, (1) a main body portion having a head or top portion at one end and a winding member at the opposite end, and (2) a crank handle being connected to the head or top portion of the main body portion.

An object of the current invention is to provide a seat belt tensioning apparatus which would nicely complement the existing child seat securing mechanism. A child seat is typically secured to a seat of a vehicle in some fashion utilizing the seat belts that are provided inside the vehicle. The current novel tensioning apparatus may simply be attached to a seat belt either before or after it has been passed through or around the child seat to secure the child seat. Therefore, the current tensioning apparatus would work nicely in conjunction with the seat belt to improve the retention of the child seat in the vehicle seat.

Another object of the current invention is to provide an apparatus to improve the retention of the child seat by removing the excess slack and thereby increase the tension of the seat belt. The novel tensioning apparatus has a winding member. In the preferred embodiment, the winding member includes two winding extensions. The two winding extensions are spaced apart such that a belt receiving space between the two winding extensions exists for a user to insert the seat belt webbing. After inserting the seat belt webbing into the belt receiving space, the user can remove the slack in the seat belt first by first turning the crank handle to the side opposite the winding members to an open position, and then rotating the crank handle clockwise along a plane generally perpendicular to the main body portion of the tensioning apparatus. After every rotation, more seat belt webbing wraps around the winding extensions, resulting eventually in the complete removal of the excess slack. Following the removal of excess seat belt slack, the user can turn the crank handle to the same side as the winding member to a lock position. By properly placing the crank handle in the lock position, the user effectively locks the tensioning apparatus to the seat belt and prevents the apparatus from unwinding, thereby maintaining the tension of the seat belt.

The above described and many other features and attendant advantages of the present invention will become apparent as the invention becomes better understood by reference to the following detailed description when considered in conjunction with the accompanying drawings.

DETAILED DESCRIPTION OF PREFERRED EMBODIMENT

The present invention pertains to general means for securing a child seat to a vehicle seat, and, in particular, to the construction and use of a new an improved seat belt tensioning apparatus that may be used to improve the retention of a child seat in a vehicle by removing the excess slack in the seat belt. A seat belt tensioning apparatus in accordance with the preferred embodiment of the present invention includes, among other elements, (1) a main body portion having a head or top portion at one end and a winding member at the opposite end, and (2) a crank handle being connected to the head or top portion of the main body portion. The winding member of the main body portion has a plurality of winding extensions. In the preferred embodiment, the winding member includes two winding extensions. The winding extensions are sufficiently spaced apart to form a belt reception space to receive a seat belt webbing. After the seat belt webbing is inserted into the belt reception space, the crank handle may then be turned to cause seat belt webbing to wind around the winding extensions, thereby removing excess slacks in the seat belt. The current inventive seat belt tensioning apparatus and its operation will be described below in more detail.

The following detailed description is provided to enable any person skilled in the art to make and use the invention and to set forth the best modes contemplated by the inventor for carrying out the invention. This description is not to be taken in a limiting sense, but is made merely for the purpose of illustrating the general principles of the invention.

Figure 1:
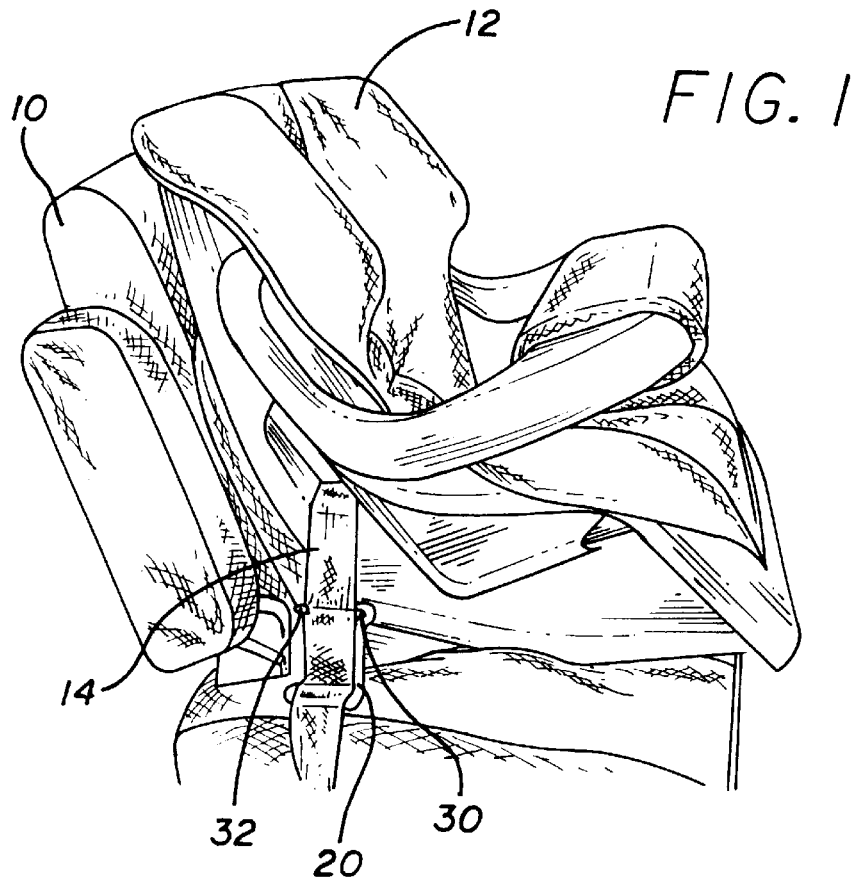
FIG. 1 illustrates a perspective view of an child seat assembly with an attached exemplary seat belt tensioning apparatus used to improve the retention of a child seat in a vehicle.

FIG. 1 illustrates a perspective view of an child seat assembly with an exemplary seat belt tensioning apparatus 20 attached. A child seat 12 is mounted on a vehicle seat 10. Seat belts 14 are usually provided along with the vehicle seat 10. These seat belts 14 may come in various forms, e.g. lap belts, shoulder belts, combined lap and shoulder belts, and the like, and are typically provided in the vehicle. The seat belts 14 are typically used to secure the child seat 12 to the vehicle seat 10. The child seat 12 is secured to a vehicle seat 10 by passing a seat belt 14 through the child seat 12, effectively buckling the child seat 12 in place on the vehicle seat 10 just as a passenger would buckle himself or herself to the vehicle seat 10. However, the seat belt 14 may be routed at times through a complex path about the child seat 10. As a result, the seat belt 14 may end up having excess slack. The excess slack may cause the child seat 12 to move around in the vehicle seat 10 and the child occupant to move around in the child seat 12, thereby exposing the child occupant to a higher risk of injury. In FIG. 1, the seat belt tensioning apparatus 20 is attached to the seat belt 14. The shown tensioning apparatus 20 was used to remove the excess slack in the seat belt 14. The crank handle 30 has also been properly placed in a lock position to prevent the tensioning apparatus 20 from unwinding and to maintain the tension of the seat belt 14. FIGS. 2–6 provide more detail illustrations of how to operate the tensioning apparatus.

Figure 2:
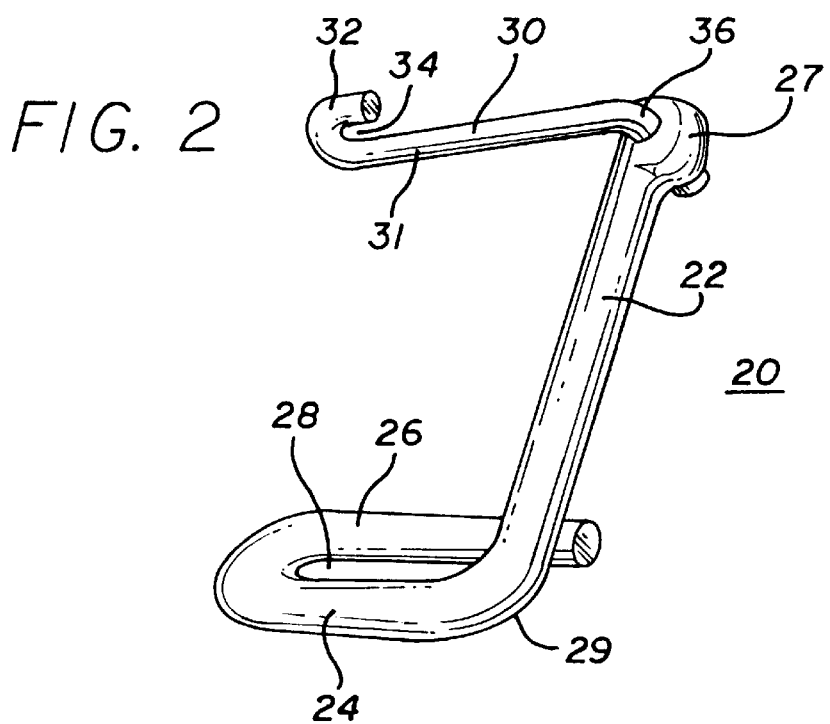
FIG. 2 shows an isometric perspective view of the exemplary seat belt tensioning shown in FIG. 1. The tensioning apparatus is shown with the crank handle in the lock position.

An isometric perspective view of an exemplary seat belt tensioning apparatus is illustrated in FIG. 2. The crank handle 30 is turned to same side as the winding member 29. This is lock position of the crank handle 30. The exemplary tensioning apparatus 20 has a main body portion 22. The main body portion 22 has a head or top portion 27 at one end, and a winding member 29 at the opposite end. The head or top portion 27 has an aperture adapted to receive the crank handle 30. The crank handle 30 has a body 31 that is connected to a connecting portion 36 at one end and a belt retaining portion 32 at the opposite end. The connection portion 36 of the crank handle 30 is inserted into the head or top portion's aperture to form a rotatable connection. In the preferred embodiment, the belt retaining portion 32 of the crank handle 30 is a hook that has a gap 34. The gap 34 provides a space to insert a seat belt webbing; and the hook serves as a retainer that holds the seat belt webbing in place. When the crank handle 30 is placed on the same side as the winding member 29, the handle 30 is in its lock position. By placing the crank handle 30 in the lock position, the user locks the tensioning apparatus 20 to the seat belt 14 to prevent the apparatus 20 from unwinding, thereby maintaining the tension of the seat belt 14.

In the preferred embodiment of the tensioning apparatus 20, the winding member 29 of the tensioning apparatus 20 has two winding extensions, an initial winding extension 24 and a the reentrant winding extension 26. The two winding extensions are connected to each other and also to the main body portion 22 of the tensioning apparatus 20 to form a unitary and continuous piece. The initial winding extension 24 extends away from the main body portion 22. However, the reentrant winding extension 26 extends back toward the main body portion 22 until it overlaps the main body portion 22. The reentrant winding extension 26 overlaps the main body portion 22 without touching it, leaving a gap 25 (shown in FIG. 6) where a seat belt webbing 16 may be inserted.

Figure 3:
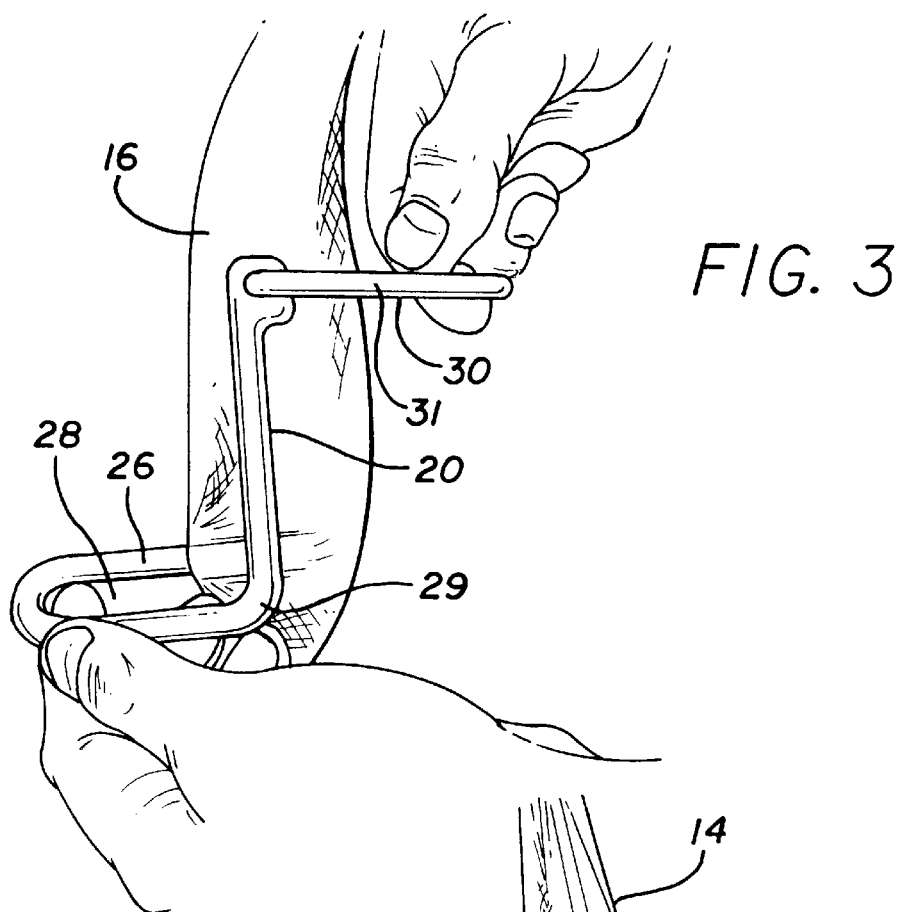
FIG. 3 illustrates the initial stage of attaching the tensioning apparatus to the seat belt by inserting the seat belt into the belt reception space of the apparatus.
Figure 4:
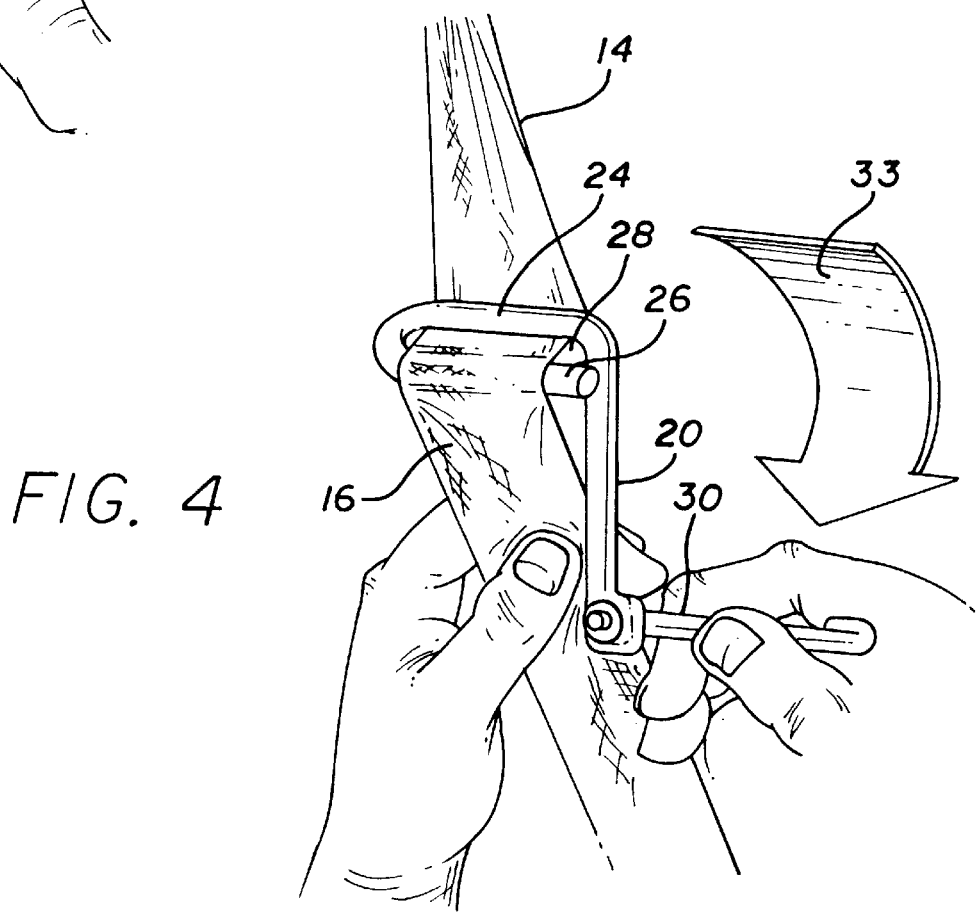
FIG. 4 shows the crank handle of the tensioning apparatus being turned in the clockwise direction, causing the seat belt to wrap around the winding member of the apparatus.

FIGS. 3 shows a perspective view of an exemplary tensioning apparatus 20 with the crank handle 30 being in an open position, and with the seat belt 14 being initially slid into the belt reception space 28 of the winding member 29. To put the crank handle 30 in the open position, a user would rotate the handle 30 generally toward the side that is opposite from the winding member 29. The seat belt webbing 16 may be slid into the belt reception space 28 through the belt insertion gap 25 (shown in FIG. 6) formed between the reentrant winding extension 26 and the main body portion 22. After the seat belt webbing 16 is inserted into the belt reception space 28 and the crank handle 30 is placed in the open position, the handle 30 can be rotated indicated by the direction arrow 33 shown in FIG. 4. After every rotation, additional seat belt webbing wraps around the winding extensions 24, 26, resulting in additional removal of excess slack. After a number of rotations, the excess slack in the seat belt 14 will be completely removed, as shown in FIGS. 1 and 5.

Figure 5:
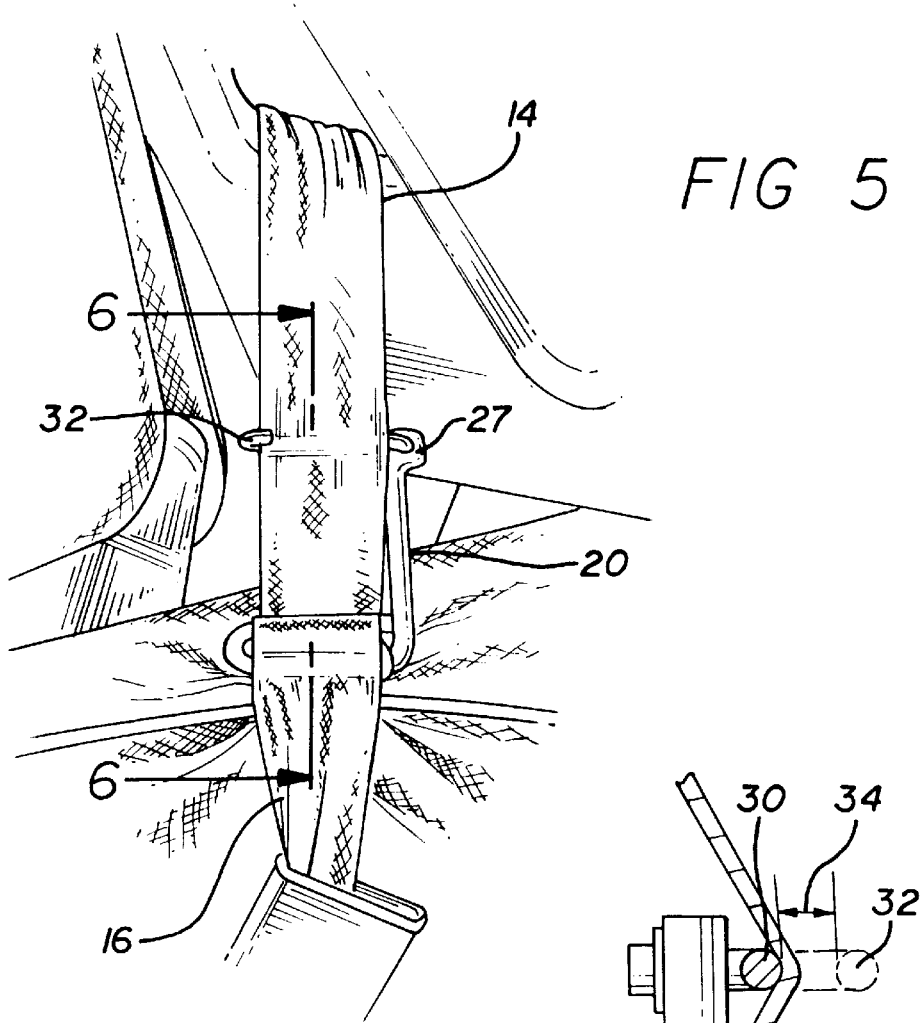
FIG. 5 illustrates an enlarged perspective view of an exemplary tensioning apparatus being attached to a seat belt, as shown in FIG. 1.
Figure 6:
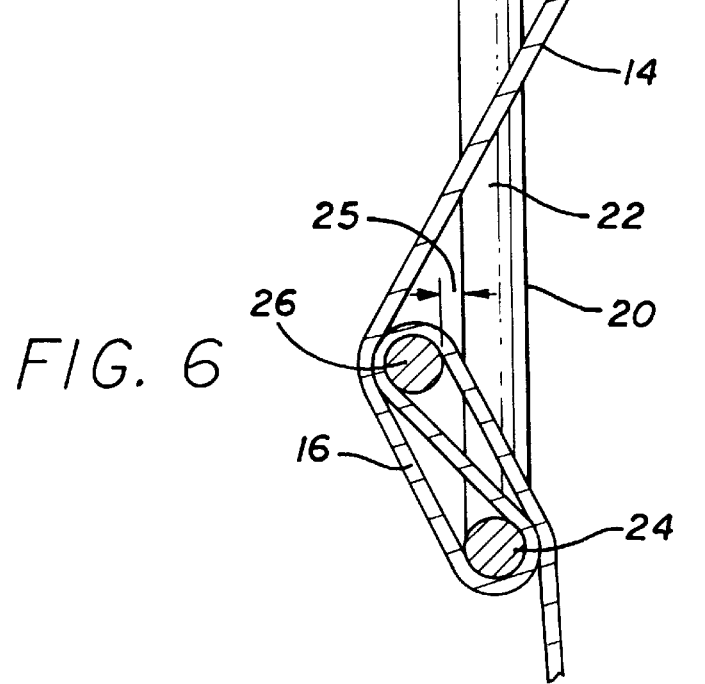
FIG. 6 shows a cross sectional view taken along line 6—6 of FIG. 5.

After all excess slack in the seat belt 14 is removed, the crank handle 30 may then be placed in a lock position as shown in FIGS. 1, 2, and 5. As stated above, the crank handle 30 has a crank handle body 31 that is connected to a belt retaining portion 32 at one end. In the preferred embodiment, the belt retaining portion 32 is a hook that has a gap 34. The gap 34 provides a space to insert the seat belt webbing 16 such that the webbing 16 overlays the crank handle body 31 as shown in FIGS. 1 and 5; and the hook serves as a retainer that holds the seat belt webbing 16 in place. With the crank handle 30 being in the lock position, the tensioning apparatus 20 is prevented from unwinding, and the tension of the seat belt 14 is therefore maintained. Furthermore, the tensioning apparatus 20 remains locked to the seat belt 14 until the user manually releases it. As a result, the child seat 12 is better secured to the vehicle seat 10, making it safer to transport a child in the vehicle.

Figure 7:
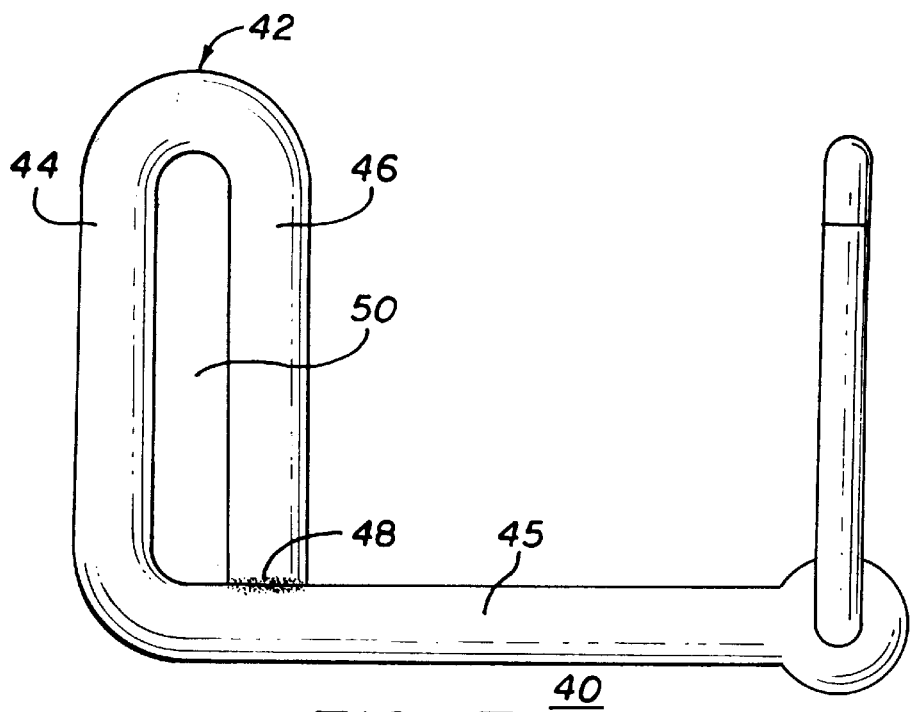
FIG. 7 illustrates a front elevational view of an alternative embodiment of the current inventive tensioning apparatus.
Figure 8:
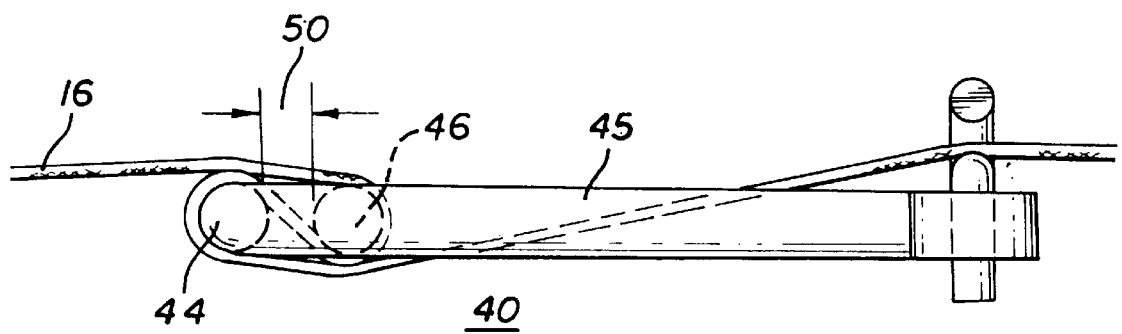
FIG. 8 shows a side elevational view of the alternative embodiment of the tensioning apparatus as shown in FIG. 7.

FIGS. 7 and 8 illustrates an alternative embodiment of the current inventive tensioning apparatus. FIG. 7 shows a front elevational view of the alternative embodiment; and FIG. 8 shows a side elevational view of the alternative embodiment. The alternative embodiment also has a winding member 42 that includes an initial winding extension 44 and a reentrant winding extension 46. The two winding extensions 44, 46 are connected to each other and also to the main body portion 45 to form a unitary and continuous piece. The initial winding extension 44 extends away from the main body portion 45. However, the reentrant winding extension 46 extends back toward the main body portion 45 until it contacts the main body portion 45 at the location depicted by reference numeral 48. At the contact point 48, the reentrant winding extension 46 is permanently secured to the main body portion 45 by welding or the like. The winding extensions 44, 46 are sufficiently spaced apart to form a belt reception space 50. However, unlike the preferred embodiment shown in FIGS. 1–6, the alternative embodiment shown in FIGS. 7 and 8 does not have belt insertion gap 25 (shown in FIG. 6) since the reentrant winding extension 46 is permanently secured to the main body portion 45 at the point of contact 48. The permanent attachment of the reentrant winding extension 46 provides additional structural support and further strengthens the apparatus 40.

Furthermore, the winding extensions 44, 46 of the alternative embodiment generally reside on the same plane as the main body portion 45. Due to its design, sufficient seat belt webbing 16 can be secured by turning the apparatus 40 approximately 180 degrees. As designed, the alternative embodiment is easier to used in areas where there is a lack of space.

Although the present invention has been described in terms of the preferred embodiment, numbers modifications and/or additions to the above-described preferred embodiments would be readily apparent to one skilled in the art. Thus, by way of example, and not of limitation, there may be three winding extensions, rather than two as in the preferred embodiment. Furthermore, in the preferred embodiment, the winding extensions are connected to each other and to the main body portion to form a unitary and continuous piece. In an alternative embodiment, the winding extensions may be formed as one and continuous piece which is then attached to the main body portion by welding or the like. Also, in the preferred embodiment, the crank handle is inserted into the aperture of the head or top portion to form a rotatable connection. However, in an alternative embodiment, the crank handle is slidably connected to the head portion's aperture such that the crank handle may be slid into an open or lock position. Accordingly, the present invention is not limited to the specific embodiment illustrated and described hereinabove.

What is claimed is:

1. A child safety seat assembly, comprising:
   a child safety seat being mounted on a vehicle seat; said vehicle seat including a seat belt; said seat belt being passed through said child safety seat to secure said child safety seat to said vehicle seat; and
   a seat belt tensioning apparatus adapted to remove excess slack in said seat belt;
   said seat belt tensioning apparatus having a main body and a crank handle;
   said main body having a head portion and a winding member;
   said crank handle being attached to said head portion to secure said crank handle to said main body; and
   said winding member including at least first and second winding extensions, said winding extensions being spaced apart such that a belt reception space is formed between said winding extensions;
   whereby a portion of said seat belt may be inserted into said belt reception space, and said winding member may then be rotated by rotating said handle to wind said seat belt portion around said winding extensions.

2. A child safety seat assembly as claimed in claim 1, wherein said winding member includes an initial winding extension that extends away from said main body, and a reentrant winding extension that extends back toward said main body until said reentrant winding extension generally overlaps said main body.

3. A child safety seat assembly as claimed in claim 1, wherein said winding member includes an initial winding extension that extends away from said main body, a reentrant winding extension that extends back toward said main body until said reentrant winding extension touches said main body at a point of contact, and said reentrant winding extension is permanently secured to said main body at said point of contact.

4. A child safety seat assembly as claimed in claim 1, wherein said crank handle may be positioned to a same side as said winding extensions to lock said tensioning apparatus to said seat belt.

5. A child safety seat assembly as claimed in claim 1, wherein said crank handle is rotatably secured to said main body.

6. A child safety seat assembly as claimed in claim 1, wherein said crank handle is slidably secured to said main body.

7. A child safety seat assembly as claimed in claim 1, wherein said crank handle includes a belt latching portion at one end, and said belt latching portion is adapted to latch said crank handle onto said seat belt.

8. A method for using a seat belt tensioning apparatus to improve the retention of a child safety seat on a seat in a vehicle, said tensioning apparatus having (1) a head portion, (2) a winding member being connected to said head portion, and (3) a crank handle being attached to said head portion, comprising the steps of:
   mounting said child safety seat on said vehicle seat;
   securing said child safety seat to said vehicle seat using a seat belt;
   inserting a portion of said seat belt into said tensioning apparatus;
   placing said crank handle in an open position;
   rotating said winding member by turning said crank handle to wind said seat belt portion around said winding member; and
   placing said crank handle in a lock position to lock said tensioning apparatus to said seat belt.

9. A method as claimed in claim 8, wherein the step of placing said crank handle in said open position includes moving said crank handle generally toward a side opposite from said winding member.

10. A method as claimed in claim 8, wherein the step of placing said crank handle in said lock position includes moving said crank handle to a same side as said winding member.

11. A method as claimed in claim 8, further comprises a step of forming a belt latching portion at one end of said crank handle to latch said crank handle onto said seat belt.

12. A tensioning apparatus comprising:

a top section; a winding member being connected to said top section and having a belt reception space, and a crank handle being attached to said top section; whereby a portion of a seat belt may be inserted into said belt reception space, and said winding member may then be rotated by turning said crank handle to wind said seat belt portion around a plurality of winding extensions, wherein said crank handle has a belt latching portion at one end, and said belt latching portion may be used to latch said crank handle onto said seat belt.

13. A tensioning apparatus comprising:

a top section; a winding member being connected to said top section and having a belt reception space; and a crank handle being attached to said top section; whereby a portion of a seat belt may be inserted into said belt reception space, and said winding member may then rotated by turning said crank handle to wind said seat belt portion around a plurality of winding extensions, further comprising a main body having said top section at one end and said winding member at an opposite end, and said winding member includes said plurality of winding extensions, wherein said plurality of winding extensions include an initial winding extension that extends away from said main body, and a reentrant winding extension that extends back toward said main body until said reentrant winding extension generally overlaps said main body.

* * * * *